United States Patent [19]

Feeney

[11] 4,046,838

[45] Sept. 6, 1977

[54] ADHESIVE COMPOSITIONS OF A BLOCK COPOLYMER AND TACKIFYING RESIN

[75] Inventor: George W. Feeney, Akron, Ohio

[73] Assignee: The Goodyear Tire & Rubber Company, Akron, Ohio

[21] Appl. No.: 622,271

[22] Filed: Oct. 10, 1975

Related U.S. Application Data

[63] Continuation of Ser. No. 490,834, July 22, 1975, abandoned, which is a continuation of Ser. No. 287,946, Sept. 11, 1972, abandoned.

[51] Int. Cl.$^2$ .................. C08L 51/00; C08L 53/00
[52] U.S. Cl. .......................... 260/876 B; 526/237; 526/283; 526/290; 528/500; 427/207 B; 428/483
[58] Field of Search .............. 260/876 B; 526/290, 526/237, 283

[56] References Cited

U.S. PATENT DOCUMENTS

| | | | |
|---|---|---|---|
| 3,325,430 | 6/1967 | Grasley | 260/876 B |
| 3,607,829 | 9/1971 | Harris | 260/415 R |
| 3,686,107 | 8/1972 | Russell | 260/27 BB |
| 3,784,530 | 1/1974 | Osborn et al. | 260/80.7 |

Primary Examiner—Richard B. Turer
Attorney, Agent, or Firm—F. W. Brunner; H. C. Young, Jr.

[57] ABSTRACT

A composition which comprises a mixture of (a) an unvulcanized elastomeric block copolymer having the general configuration A — B — A, where A is a non-elastomeric styrene polymer block and B is an elastomeric diene polymer block of 1,3-butadiene and (b) a tackifying resin containing carbon-to-carbon unsaturation, characterized by having a softening point of about 60° C. to about 110° C. and comprising about 30 to about 55 weight percent units derived from piperylene, about 20 to about 45 weight percent units derived from 2-methyl-2-butene, about 15 to about 30 weight percent units derived from dicyclopentadiene and about 20 to about 35 weight percent units derived from α-methyl styrene. The composition has particular utility as a pressure-sensitive adhesive.

3 Claims, No Drawings

ADHESIVE COMPOSITIONS OF A BLOCK COPOLYMER AND TACKIFYING RESIN

This is a continuation of application Ser. No. 490,834 filed July 22, 1975, now abandoned, which is a continuation of Ser. No. 287,946, filed Sept. 11, 1972, now abandoned.

The invention relates to adhesive compositions and to methods for their preparation. While the invention is not restricted thereto, it has particular reference to pressure-sensitive adhesives. It further relates to pressure-sensitive tapes.

Various adhesives can advantageously be used as pressure-sensitive, laminate and hot melt adhesives. Most are generally known for their ability to form bonded laminated articles and some are more particularly known as pressure-sensitive adhesives and some as hot melt adhesives.

Pressure-sensitive adhesives and adhesive-coated masking tapes and the like are well known. These products commonly contain natural rubber and a thermoplastic tackifier resin compatible therewith. The adhesive, coated on a flexible backing to form a tape, is tacky at normal room temperatures and adheres instantly and tightly to surfaces against which it is pressed without requiring moistening or heating. It typically is required to have good shear strength, 180°peel strength and rolling ball tack in order to be commercially useful.

Heretofore, adhesive compositions have been prepared by mixing conjugated diene-monovinyl aromatic hydrocarbon block copolymers such as, for example, polystyrene-polybutadiene-polystyrene block polymers, with tackifying resins containing aromatic substituents. However, for many applications, such as pressure-sensitive, laminating and hot melt adhesives, these adhesive compositions have insufficient tack to be commercially useful. In particular, pressure-sensitive tapes prepared therefrom typically have had insufficient shear strength, 180°peel strength and rolling ball tack, which are critical physical properties for most commercial tapes.

Therefore, it is an object of this invention to provide adhesive compositions having improved adhesive properties and to provide a method for their preparation.

In accordance with this invention it has been found unexpectedly that an adhesive composition, suitable as a pressure-sensitive adhesive, comprises a mixture of (a) an unvulcanized elastomeric block copolymer having the general configuration A — B — A wherein each A is an independently selected nonelastomeric styrene polymer block having an average molecular weight of 2,000 to 100,000 and a glass transition temperature above about 25°C., the total block A content being from about 10 to about 50 percent by weight of the copolymer, and B is an elastomeric conjugated diene polymer block of 1,3-butadiene having an average molecular weight from about 25,000 to about 1,000,000 and a glass transition temperature below about 10° C., said copolymer having a tensile strenght at 25° C. in excess of about 200 pounds per square inch, and (b) a compatible, thermoplastic tackifying resin containing carbon-to-carbon unsaturation therein and characterized by having a softening point in the range of about 60° C. to about 110° C. comprising from about 30 to about 55 weight percent units derived from piperylene, from about 20 to about 45 weight percent units derived from 2-methyl-2-butene, from about 15 to about 30 weight percent units derived from dicyclopentadiene and from about 20 to about 35 weight percent units derived from a-methyl styrene prepared by the method which comprises polymerizing in the presence of an anhydrous catalyst selected from aluminum chloride and ethylaluminum dichloride and a solvent selected from aliphatic and aromatic hydrocarbons a mixture which comprises from about 15 to about 50 weight percent piperylene, from about 15 to about 50 weight percent 2-methyl-2-butene, from about 5 to about 40 weight percent dicyclopentadiene and from about 5 to about 40 weight percent α-methyl styrene, where the mole ratio of piperylene to 2-methyl-2-butene is in the range of about 0.8:1 to about 1.8:1.

The thermoplastic tackifying resins for this invention are characterized by having a softening point in the range of about 60° C. to about 110° C. according to ASTM Method E 28-58 T, although they can typically have a softening point of about 70° C. to about 110° C. with vigorous steam stripping to remove low molecular weight materials including dimers, trimers and tetramers. The resins typically have good heat stability, a specific gravity at about 0.85 to about 1.0, an acid number at less than about 1.0 and a Gardner color in the range of about 4 to about 10.

In the practice of this invention, adhesive compositions can be prepared by mixing the tackifying resin with the elastomeric block copolymer in the presence of volatile organic hydrocarbon solvents at various temperatures such as from about 0° C. to about 100° C. and typically from about 20° C. to about 60° C. but above the freezing point of the mixture and below its boiling point. Various aliphatic and aromatic hydrocarbons can be used. Representative examples of such aromatic hydrocarbons are toluene and benzene and representative examples of aliphatic hydrocarbons are pentane, hexane, heptane and octane. A particularly suitable hydrocarbon solvent is a mixture containing from about 10 to about 90 parts of toluene and correspondingly from about 90 to about 10 parts of hexane. This adhesive mixture is then suitable for bonding substrates such as by simply applying it to the substrate surfaces, partially drying it, and contacting the said substrate surfaces with the adhesive mixture therebetween and drying the said adhesive.

The mixture has particular utility as a pressure-sensitive adhesive. For example, pressure-sensitive tapes can easily be prepared by applying the solution of the adhesive mixture to a flexible substrate and drying the mixture. The adhesive of this invention also has utility as a hot melt pressure-sensitive adhesive, particularly when prepared by mixing the elastomeric block copolymer, the hydrocarbon tackifying resin and a minor amount of an oil such as a petroleum derived or coal tar derived oil or with liquid or low softening point resins. Particularly suitable is mineral oil. The hot melt adhesive is simply applied by heating the mixture, applying it to a substrate and cooling. After cooling, it is surprisingly found that the adhesive has good pressure-sensitive properties.

In the preparation of the adhesive of this invention, it is understood that minor amounts of various antioxidants and fillers can be added and mixed therewith in order to further improve its aging characteristics and various physical properties.

For the preparation of the tackifying resin required by this invention, various anhydrous metallic halide catalysts can be used. Representative examples of such catalysts are aluminum chloride and ethylaluminum dichloride. Anhydrous aluminum chloride is preferred.

In carrying out the polymerization reaction, the hydrocarbon mixture is brought into contact with the anhydrous halide catalyst. Generally, the solid catalyst is used in particulate form. Generally, a particle size in the range of from about 5 to about 200 mesh size is used although larger or smaller particles can be used. The amount of catalyst used is not critical although sufficient catalyst is used to cause a polymerization reaction to occur. The catalyst may be added to the olefinic hydrocarbon mixture or the hydrocarbon mixture may be added to the catalyst. If desired, the catalyst and mixture of hydrocarbons can be added simultaneously or intermittently to a reactor. The reaction can be conducted continuously or by batch process techniques generally known to those skilled in the art.

The reaction is conveniently carried out in the presence of a diluent because it is usually exothermic. However, with adequate mixing and cooling the temperature can be controlled and reaction conducted without a diluent being present. Various diluents which are inert in that they do not enter into the polymerization reaction may be used. Representative examples of inert diluents are aliphatic hydrocarbons such as pentane, hexane, and heptane, aromatic hydrocarbons such as toluene and benzene, and unreacted residual hydrocarbons from the reaction.

A wide range of temperatures can be used for the polymerization reaction. The polymerization can be carried out at temperatures in the range of from about −20° C. to about 50° C., although usually the reaction is carried out to a temperature in the range of from about 10° C. to about 35° C. The polymerization reaction pressure is not critical and may be atmospheric or above or below atmospheric pressure. Generally, a satisfactory polymerization can be conducted when the reaction is carried out at about autogeneous pressure developed by the reactor under the operating conditions used. The time of the reaction is not generally critical and reaction times can vary from a few seconds to 12 hours or more.

The polymers can be modified by the addition of up to about 25 weight percent of piperylene dimers or piperylene trimers or other unsaturated hydrocarbons, particularly hydrocarbons containing from 4 to 6 carbon atoms, preferably diene hydrocarbons, and mixtures thereof to the piperylene/ 2-methyl-2-butene/-dicyclopentadiene/α-methyl styrene mixture. Representative examples of such hydrocarbons are butene and substituted butenes such as 2-methyl-1-butene, 2,3-dimethyl-1-butene, 2,3-dimethyl-2-butene, 3,3-dimethyl-1-butene; the pentenes and substituted pentenes such as 1-pentene, 2-pentene, 2-methyl-1-pentene, 2-methyl-2-pentene, 3-methyl-2-pentene, 4-methyl-1-pentene, 4-methyl-2-pentene; the hexenes such as 2-hexene; diolefins such as 1,3-butadiene and isoprene; and cyclic unsaturated hydrocarbons such as cyclopentene, cyclohexene and 1,3-cyclopentadiene.

Surprisingly, the structure of the tackifying resin for this invention is somewhat dependent on the solvent used in its preparation. For example, a monomer mixture comprising 23 weight percent piperylene, 21.5 weight percent 2-methyl-2-butene, 20 weight percent dicyclopentadiene and 20 weight percent α-methyl styrene polymerized with aluminum chloride in the presence of toluene produced a resin having a softening point of about 84° C.; in the presence of dichloromethane, produced a resin having a softening point of about 95° C.; and in the presence of heptane, producing a resin having a softening point of about 97°C. It, therefore, unexpectedly appears that polymerizations in the presence of aliphatic straight chain hydrocarbons having from 4 to 8 carbon atoms, such as butane, pentane, heptane and octane, including dichloromethane, produce resins having somewhat higher softening points than such polymerizations conducted in the presence of aromatic hydrocarbons, such as toluene, benzene and xylene. Thus, although the resins of this invention are generally characterized by having softening points in the range of about 60° C. to about 100° C., it is a feature of this invention that such resins prepared with particulate anhydrous aluminum chloride in the presence of such aliphatic hydrocarbons, which herein include dichloromethane, have a softening point in the range of about 80°C. to about 100° C. and in the presence of such aromatic hydrocarbons have a softening point in the range of about 60° C. to about 90° C.

The resins of this invention can typically be further characterized by being generally soluble in aliphatic hydrocarbons such as pentane, hexane, and heptane and in aromatic hydrocarbons such as benzene and toluene. It is to be understood that these resins can have their composition modified, while maintaining their characterizations, by containing up to about 25 weight percent derived from the said piperylene dimers, piperylene trimers and other unsaturated hydrocarbons containing from 4 to 6 carbon atoms based on the total resin.

The unvulcanized elastomeric block copolymer used in this invention comprises nonelastomeric terminal polymer blocks and internal elastomeric polymer blocks. The characteristics of the internal or middle block, which is elastomeric, may be that expressed in ASTM Special Technical Bulletin No. 184 as follows: "A substance that can be stretched at room temperature to at least twice its original lenght and, after having been stretched and the stress removed, returns with force to approximately its original length in a short time."

The terminal nonelastomeric blocks constitute polymeric blocks which do not meet this definition. Furthermore, the difference between glass transition temperatures of the end blocks and middle blocks should be at least 40° C. and preferably at least 100° C.

Typically, the unvulcanized elastomeric copolymers can be prepared by first polymerizing styrene with a lithium based initiator. A suitable lithium based initiator is, for example, lithium metal, alkyl lithium compounds, lithium hydrocarbyls and organo lithium amides. The alkyl lithium compounds are preferred. Particularly preferred alkyl lithium compounds are branched chain, preferably secondary alkyl lithiums. Such alkyl lithium compounds especially include secondary butyl lithium, isobutyl lithium, isoamyl lithium and secondary amyl lithium.

After polymerizing this monomer to an average molecular weight of from about 2000 to about 100,000, and preferably from about 5000 to about 30,000, 1,3-butadiene and additional amounts of styrene are added to the polymerization mixture.

The polymerization then continues to provide an elastomeric middle block polymer of butadiene having an average molecular weight of from about 25,000 to about 1,000,000 and more preferably between about 50,000 and about 500,000, followed by a nonelastomeric block polymer of styrene.

Typically inert hydrocarbon solvents are aliphatic hydrocarbons (including cycloaliphatic) such as cyclohexane and a typical aromatic hydrocarbon is benzene. Usually the amount of initiator should be maintained as low as possible, but may be varied over a relatively wide range such as from about 1 to about 200 parts per million, based on the weight of the monomers present.

The following examples further illustrate the invention and are not intended to be limiting. In these examples, parts and percentages are by weight unless otherwise indicated. Examples I–III typify the tackifying resin and Example IV illustrates the adhesive composition.

EXAMPLE I

Into a reactor were placed 100 parts of heptane and 3 parts of anhydrous aluminum chloride. While continuously stirring the mixture, 200 parts of a hydrocarbon mixture were slowly added to the reactor over a period of about 90 minutes. The hydrocarbon mixture had the following composition:

| Component | Percent |
| --- | --- |
| Piperylene (1,3-pentadiene) | 28.5 |
| 2-methyl-2-butene | 28.0 |
| Dicyclopentadiene | 20.0 |
| α-methyl styrene | 20.0 |
| Other unsaturated hydrocarbons containing 4 to 6 carbon atoms | 3.5 |
| | 100.0 |

The temperature of the reaction was maintained in a range of about 25° C. to 30° C. After an hour of agitation from the time of final addition of the hydrocarbon mixture, approximately 5 parts water and 20 parts lime, hydrated calcium hydroxide, were added to neutralize and decompose the aluminum chloride. The mixture was filtered to remove particles of decomposed aluminum chloride and lime.

The filtrate was steam distilled to a pot temperature of about 235° C. The resulting residual molten resin was poured from the pot onto an aluminum tray and cooled to about 23° C. to form 144 parts of a hard brittle pale yellow resin having a Gardner color (50 percent in toluene) of 8.5 and a softening point (Ball and Ring), according to ASTM Method E 28-58 T of 96° C.

The distillate comprised 138 parts of a hydrocarbon mixture. An analysis of the hydrocarbon mixture was compared to that of the hydrocarbon mixture originally added to the reactor which indicated that the prepared resin comprised the following units:

| Component | Percent |
| --- | --- |
| Piperylene | 32.1 |
| 2-methyl-2-butene | 22.9 |
| Dicyclopentadiene | 22.2 |
| α-methyl styrene | 21.4 |
| Other unsaturated hydrocarbons containing 4 to 6 carbon atoms | 1.4 |
| | 100.0 |

EXAMPLE II

Into a reactor were placed 100 parts of toluene and 3 parts of anhydrous aluminum chloride. While continuously stirring the mixture, 200 parts of a hydrocarbon mixture were slowly added to the reactor over a period of about 90 minutes. The hydrocarbon mixture had the following composition:

| Component | Percent |
| --- | --- |
| Piperylene | 28.5 |
| 2-methyl-2-butene | 28.0 |
| Dicyclopentadiene | 20.0 |
| α-methyl styrene | 20.0 |
| Other unsaturated hydrocarbons containing 4 to 6 carbon atoms | 3.5 |
| | 100.0 |

The temperature of the reaction was maintained in a range of about 25° C. to 30° C. After an hour of agitation from the time of final addition of the hydrocarbon mixture, approximately 5 parts water and 20 parts lime, hydrated calcium hydroxide, were added to neutralize and decompose the aluminum chloride. The mixture was filtered to remove particles of decomposed aluminum chloride and lime.

The filtrate was steam distilled to a pot temperature of about 235°C. The resulting residual molten resin was poured from the pot onto an aluminum tray and cooled to about 23° C. to form 153 parts of a hard brittle pale yellow resin having a Gardner color (50 percent in toluene) of 6.5 and a softening point (Ball and Ring), according to ASTM Method E 28-58 T of 82.5° C.

The distillate comprised 118 parts of a hydrocarbon mixture. An analysis of the hydrocarbon mixture was compared to that of the hydrocarbon mixture originally added to the reactor which indicated that the prepared resin comprised the following units:

| Component | Percent |
| --- | --- |
| Piperylene | 30.0 |
| 2-methyl-2-butene | 26.0 |
| Dicyclopentadiene | 19.5 |
| α-methyl styrene | 21.3 |
| Other unsaturated hydrocarbons containing 4 to 6 carbon atoms | 3.2 |
| | 100.0 |

EXAMPLE III

Into a reactor were placed 100 parts of dry dichloromethane and 3 parts of anhydrous aluminum chloride. While stirring the mixture, 200 parts of a hydrocarbon mixture were slowly added to the reactor over a period of about 90 minutes. The hydrocarbon mixture had the following composition:

| Component | Percent |
| --- | --- |
| Piperylene | 23.0 |
| 2-methyl-2-butene | 21.5 |
| Dicyclopentadiene | 20.0 |
| α-methyl styrene | 20.0 |
| Other unsaturated hydrocarbons containing 4 to 6 carbon atoms | 15.5 |
| | 100.0 |

The temperature of the reaction was maintained in a range of about 25° C. to about 30° C. The reaction mixture was allowed to continue reacting for an additional 90 minutes after the addition of the hydrocarbon mixture.

The reaction mixture was then neutralized by adding 5 parts water and 20 parts lime, hydrated calcium hydroxide, to the reactor.

The filtered resin solution was steam stripped in a stripping column. Approximately 125 parts of resin was produced. The resin had a softening point of 95° C.

according to ASTM Method E 28-58 T and a Gardner color of 7.5.

EXAMPLE IV

A pressure-sensitive adhesive was prepared by mixing 50 parts of a resin prepared in the presence of heptane according to the method of Example I, 50 parts of an unvulcanized block copolymer of 1,3-butadiene and styrene and 300 parts of toluene at 25° C. After the rubber and resin dissolved in the toluene, a one mil coating was spread on a polyester (polyethylene terephthalate) film. The coating was dried and the coating film laminate cut into test strips. The adhesive properties of the coating were tested utilizing methods of the Pressure Sensitive Tape Council, PSTC-6 for tack, PSTC-7 for shear strength, (1000 gm/in.$^2$), and PSTC-1 for peel. The following results were obtained as shown in Table 1, indicating superior pressure-sensitive adhesive properties.

Table 1

| PSTC Test | Sample A | Sample B |
|---|---|---|
| No. 6 Tack (Rolling Ball) | 2 inches | 2 inches |
| No. 7 Shear Adhesion (500 gm/$\frac{1}{2}$ in.$^2$) | No movement after 72 hrs | No movement after 72 hrs |
| No. 1 Peal Strength (180°) | 37 ounces | 43 ounces |

The block copolymer for this example was obtained as Kraton 1101 for Sample A and 1102 for Sample B, which are trademarks of The Shell Chemical Company, as containing about 12 percent styrene by weight, a glass transition temperature of about −70° C. and a tensile strength of about 1200 pounds per square inch with an elongation of about 1300 percent measured at 25° C. and an intrinsic viscosity of 1.1 as measured in toluene at 30° C.

In this example the 180° peel strength tests were conducted according to Method PSTC-1, revised in April of 1966, of the Pressure Sensitive Tape Council. This method is found in the Fifth Edition of "TEST METHODS FOR PRESSURE SENSITIVE TAPES" developed by the Pressure Sensitive Tape Council, 1201 Waukegan Road, Glenview, Ill. This test measures the average pull value required to peel the adhesive from the substrate at 180° angle in pounds per one inch width of the test sample. The PSTC-6 test involves measuring the distance a ball rolls across a horizontally positioned pressure-sensitive sample after rolling down a prepared inclined plane. The sheer strength was measured in this example according to the method described as PSTC-7 of the Pressure Sensitive Tape Council. In particular, it was measured by applying a 500 gram weight to the sample and measuring the time required for the tape to separate from the substrate. For the purposes of this example a time of about 5 days was used.

In the practice of this invention the advantageous pressure-sensitive properties, as more clearly demonstrated by these examples, are best obtained by utilizing a composition containing from about 20 to about 80, preferably from about 40 to about 60, weight percent of the said tackifying resin based on the total tackifying resin and block copolymer.

While certain representative embodiments and details have been shown for the purpose of illustrating the invention, it will be apparent to those skilled in this art that various changes and modifications may be made therein without departing from the spirit or scope of the invention.

What is claimed is:

1. A pressure sensitive adhesive which comprises a mixture of (a) an unvulcanized elastomeric block copolymer comprised of both non-elastomeric and elastomeric polymer blocks having the general configuration A — B — A wherein each A is an independently selected non-elastomeric styrene polymer block having an average molecular weight of 5000 to 30,000 and a glass transition temperature above about 25° C, the total block A content being from about 10 to about 50 percent by weight of the copolymer, and B is an elastomeric conjugated diene polymer block of 1,3-butadiene having an average molecular weight from about 50,000 to about 500,000 and a glass transition temperature below about 10° C, said copolymer having a tensile strenght at 25° C, in excess of about 200 pounds per square inch, prepared by first polymerizing sytrene with a lithium-based initiator to a polymer of molecular weight in the range of about 5,000 to about 30,000, followed by adding 1,3-butadiene and additional amounts of styrene to the polymerization mixture, and (b) about 20 to about 80 weight percent of a compatible, thermoplastic tackifying resin containing carbon-to-carbon unsaturation therein, based on the total tackifying resin and block copolymer, and characterized by having a softening point in the range of about 70° C to about 110° C consisting essentially of from about 30 to about 55 weight percent units derived from piperylene, from about 20 to about 45 weight percent units derived from 2-methyl-2-butene, from about 20 to about 35 weight percent units derived from dicyclopentadiene and from about 20 to about 35 weight percent units derived from α-methyl styrene prepared by the method which comprises polymerizing said monomers in the presence of aluminum chloride and a solvent selected from aliphatic hydrocarbons and steam stripping the resin product.

2. The composition of claim 1 where the thermoplastic tackifying resin is modified by the addition of up to about 25 weight percent of monomers to the monomer mixture selected from piperylene dimers, piperylene trimers and other unsaturated hydrocarbons containing 4 to 6 carbon atoms.

3. The composition of claim 2 where said other hydrocarbons are selected from butene, 2-methyl-1-butene, 2,3-dimethyl-1-butene, 2,3-dimethyl-2-butene, 3,3-dimethyl-1-butene, 1-pentene, 2-pentene, 2-methyl-1-pentene, 2-methyl-2-pentene, 3-methyl-2-pentene, 4-methyl-1-pentene, 4-methyl-2-pentene, 2-hexene, 1,3-butadiene, isoprene, cyclopentene, cyclohexene and 1,3-cyclopentadiene.

* * * * *